June 21, 1955  A. RHODES  2,711,185
SLIDING SEAT STRUCTURES FOR VALVES
Filed Feb. 11, 1950

INVENTOR.
ALBERT RHODES
BY
Oberlin & Limbach
ATTORNEYS.

2,711,185
SLIDING SEAT STRUCTURES FOR VALVES

Albert Rhodes, Cleveland, Ohio

Application February 11, 1950, Serial No. 143,678

2 Claims. (Cl. 137—454.6)

The present invention relates generally as indicated to sliding seat structures for valves and although the invention is exemplarily shown in association with a water faucet and in the form of an insert adapted either to constitute a portion of the original faucet or optionally to constitute a replaceable faucet renewal insert for reconditioning a worn and leaky faucet, it is to be understood that certain features of this invention are applicable to a variety of different types of valves wherein it is desired to control the flow of fluid (liquid or gas) by the sliding of a valve member along an apertured wall between positions covering and uncovering the apertures in such wall and thus respectively stopping and permitting flow of fluid through the valve.

It is one primary object of this invention to provide a sliding seat structure which employs a resilient or elastic valve member which is disposed to be seated by the pressure of the fluid acting thereon.

Another object of this invention is to provide a sliding seat structure for valves in which the interengaging seating surfaces are self-cleaning and are so arranged that even though the seating member is made of resilient or elastic material, no extrusion thereof by the fluid under pressure into the discharge passage closed and opened thereby will occur, at least not to an extent to cause pinching action.

Another object of this invention is to provide a sliding seat structure in which the movable valve member is easy to move between the aforesaid positions opening and closing the apertured wall in the valve along which said valve member is slidable.

Another object of this invention is to provide an insert in which the seat member therein is in the form of an elastic disc and a spring means serves to connect the disc or seat member for rotation with a valve stem and to yieldably hold said disc or seat member in a seated position.

Other objects and advantages will become apparent as the following description proceeds.

To the accomplishment of the foregoing and related ends, said invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
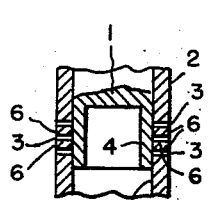
Fig. 1 is a cross-section view centrally and longitudinally through one form of sliding seat structure wherein the valve member is reciprocable longitudinally with respect to the body member containing the apertured wall.
Figure 2:
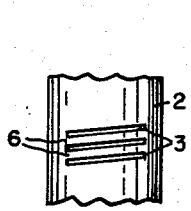
Fig. 2 is an elevation view of the construction illustrated in Fig. 1.

Referring now more particularly to the drawing and first to Figs. 1 and 2, the sliding seat structure illustrated therein comprises a cup-shaped valve member 1 of resilient or elastic material which is longitudinally reciprocable within a sleeve-like member 2 provided with two sets of transverse slits through the wall thereof adapted to be alternately covered and uncovered by the yieldable rim 4 of said valve member. The relative positioning of these two members 1 and 2 to open and close the valve with which associated may be effected in any of a variety of different ways as, for example, by reciprocating one member relative to the other either directly or through links or through a threaded connection or cams in which one member will be reciprocated responsive to rotation of the latter or a valve part swivelly connected thereto. In any case, the disposition of the valve and sleeve members 1 and 2 in a valve body is preferably such that when these members are in the position shown, the fluid under pressure in the inlet side or pressure side of the valve acts on at least one side of the rim 4 in order to maintain a fluid-tight seal with member 2 to augment the yieldable pressure applied by the valve member itself. In the case of faucets or the like, the fluid under pressure enters from the bottom end of the sleeve member 2 and thus tends to expand both sides of the rim 4 into fluid-tight engagement against the apertured wall of the sleeve member 2. The cross-section of the bore 5 in said sleeve member 2 in which said valve member 1 reciprocates is preferably circular but may obviously be non-circular if desired.

In order to preclude extrusion of the rim 4 of said valve member into the apertures in the wall of said sleeve member, these apertures are in the form of elongated and relatively narrow transverse slits 3 through the wall of sleeve member 2 to thus in effect provide grilled passages with bars 6 thereacross. It has been found as a practical matter that the width of the bars 6 between the slits 3 should be no less than the width of the slits. Actual dimensional limitations are not herein given because the same may be varied over a relatively wide range depending for example upon the magnitude of the pressure of the fluid acting upon said valve member 1 and also upon the physical properties and size of said valve member, it being apparent that when said valve member is made from a soft rubber-like material for example and the rim 4 thereof is only a few thousandths inch thick, the slits 3 will have to be narrower for a given fluid pressure than in the case where said valve member is made of a somewhat harder material or is thicker in cross-section at the rim portion 4. However, in any case the slits 3 will provide a total flow area equal to the area of the corresponding single ports which would otherwise be employed and the slits 3 will be of a width so that at any instant the length of the edge of said valve member 1 which tends to be extruded and pinched during the closing movement, and particularly just prior to complete closing, is less than the length of the edge of said valve member in association with the customary opening.

In order to provide an efficient self-cleaning action and to further preclude pinching as aforesaid, the slits are inclined as shown, or for example, up to 45° as shown with respect to the path of travel of the valve member. Such sloping or inclining of the slits enables a progressive closing and opening of the valve and achieves smooth wedging in of the portions of the valve member which will at least to a slight degree be bulged outward at the slits 3.

As apparent, during the opening and closing movements of said valve member 1 any dirt or grit particles thereon will be scraped or wiped off by the edges of slits 3 and subsequently washed or flushed away by the action of the fluid flowing therethrough and at the same time the valve member 1 will operate to wipe or clean the surface of the sleeve member 2 engaged thereby. This cleaning and wiping action assures fluid-tight sealing of the valve member with the sleeve member.

In lieu of providing a movable valve member 1 as aforesaid, said sleeve member 2 may be moved with respect to a valve member either therein or thereabout.

Figure 2A:
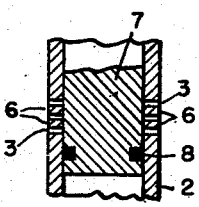
Fig. 2A is a cross-section view similar to Fig. 1 except illustrating a modification in the valve member.

In Fig. 2A, the valve member 7 which is reciprocable in sleeve 2 is in the form of a piston carrying an O ring 8 or like packing in a groove therearound, said valve member being shown in a position wherein the seal effected by ring 8 prevents flow of fluid from the lower inside of member 2 through slits 3 or vice versa. Obviously, upon shifting of the valve member 7 upwardly to position ring 8 above the slits 3, fluid communication is established between the lower inside portion and the outside of the sleeve member 2 through the slits 3. As in Fig. 1, the slits 3 prevent extrusion and pinching of ring 8 and again wiping and cleaning action is effected.

Figure 3:
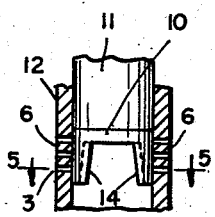
Fig. 3 is a cross-section view similar to Fig. 1 except illustrating a modification in which the resilient valve member is rotatable with respect to the apertured wall member to alternately cover and uncover the apertures in such wall.
Figure 4:
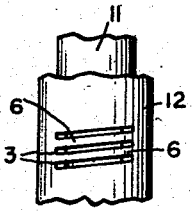
Fig. 4 is an elevation view of the construction illustrated in Fig. 3.
Figure 5:
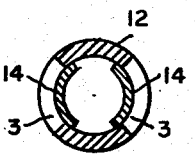
Fig. 5 is a cross-section view taken substantially along the line 5—5, Fig. 3.

In Figs. 3, 4, and 5, the valve member 10 is in the form of a resilient or elastic disc secured as by bonding or other expedient such as a screw, rivet, or the like to a rotary valve stem 11, said disc making sealed engagement within a sleeve member 12 at a region remote from the slits 3 transversely through the wall of said sleeve member. In this form of sliding seat structure the valve member 10 has downwardly depending legs 14 adapted to alternately cover and uncover slits 3 in said sleeve member 12 upon rotation of the valve member in either direction from the position shown in Figs 3 and 5.

Here again, as in the Figs. 1 and 2 construction, the slits 3 are relatively narrow and inclined to provide the self-cleaning action, to prevent extrusion and pinching of the valve member, and to facilitate relative rotation of the stem and sleeve members. However, the slits 3, while inclined, are more nearly parallel to the path of movement of the depending legs 14 whereas the slits 3 in Fig. 2 are more nearly transverse to the path of movement of valve member 1.

Figure 6:
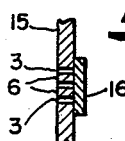
Fig. 6 is a cross-section view of a still further modification employing a slidable plate-like element which alternately covers and uncovers the apertures through a cooperating wall member.

In Fig. 6 the apertured wall member 15 including elongated relatively narrow slits 3 therethrough may constitute a web or partition in a valve body and the valve member 16 which is movable to cover and uncover the slits may be in the form of a disc or plate of resilient material slidable upwardly and downwardly as in Fig. 1 or back and forth sidewardly as in Fig. 3, pressure of the fluid again preferably acting to supplement the resilient action of the valve member 16 to obtain a fluid-tight seal between said wall member 15 and said valve member 16. The mechanism for relatively moving the valve member between the positions covering and uncovering the slits 3 has not been illustrated but obviously such mechanism can be of any desired form as for example a reciprocable rod connected to valve member 16 or a swingable arm or rotary disc carrying the valve member at a point spaced from the pivot axis of said arm or disc, etc.

Figure 7:
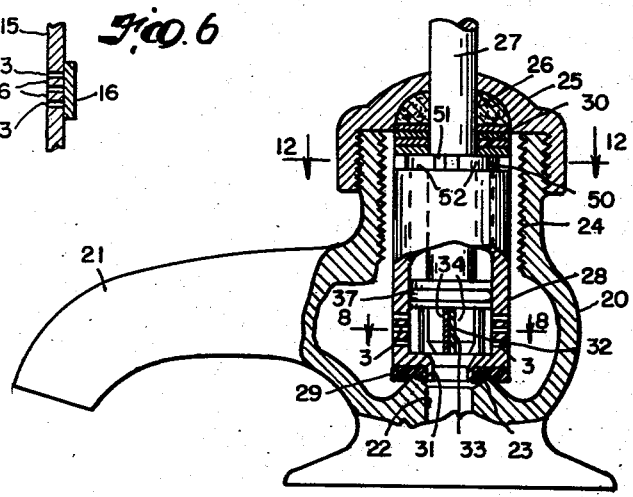
Fig. 7 is a cross-section view centrally and longitudinally through one form of the invention as assembled in the body of a conventional water faucet.
Figure 8:
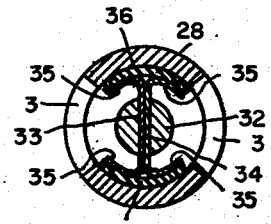
Fig. 8 is a cross-section view taken substantially along the line 8—8, Fig. 7.

Referring now to Figs. 7 and 8, the sliding seat structure is embodied in an insert for water faucets either as original equipment of the faucet or as a replaceable faucet renewal insert. In Fig. 7 there is shown a conventional faucet body 20 provided with a discharge nozzle 21, an inlet port 22 terminating in a ring seat 23, an interiorly threaded portion 24 coaxial with such seat 23 in which the original valve stem had threaded engagement, and a cap or bonnet 25 threaded upon said body and adapted to exert pressure on the packing 26. As often occurs, the seat 23 in said body becomes eroded, worn, or otherwise damaged beyond repair, thereby necessitating replacement of the entire faucet. However, with an insert of the character herein disclosed, the faucet body 20, bonnet 25 and packing 26 may be salvaged and the faucet renewed or reconditioned simply by removing the old stem and substituting therefor the insert which constitutes the present invention. Also, as disclosed in my copending application Serial No. 644,964, filed Feb. 1, 1946, now Patent No. 2,593,609, dated April 22, 1952 the old faucet handle (not shown herein) may be saved in view of the provision of a spacer on the stem 27 of the insert for rendering the stem usable for connection to a variety of handles which have different shapes and different sizes of non-circular openings therethrough, viz, hexs, octagons, squares, star broaches, etc. It will be understood that where the insert as hereinafter described is part of the original faucet, the threads 24 in said body 20 may of course be omitted and the insert otherwise modified to best suit the particular style of body.

The insert illustrated in Figs. 7 and 8 comprises a tubular body or barrel 28 carrying a rubber or rubber-like seating washer 29 at its lower end adapted to engage and thus close off the seat 23 in said faucet body 20 upon turning down of the cap 25. Interposed between the upper end of said barrel 28 and the lower end of said packing 26 are a desired number of washers 30, preferably of fiber or like material, the number of such washers which may be required varying according to the distance of different faucets from the seat 23 to the lower face of packing 26. The lower end of said barrel is formed with a tubular extension 31 which fits within the seating washer to thereby preclude radial inward distortion of said seating washer upon application of pressure on said barrel 28 as aforesaid. The bore through said extension is in register with the inlet port 22 of faucet body 20.

The lower end of said barrel 28 above said seating washer 29 is formed with a plurality of narrow transverse slits 3 through the wall thereof, said slits preferably being formed as by milling or sawing and being disposed on diametrically opposite sides of said barrel 28 whereby to establish communication therethrough between the inlet port 22 and the discharge nozzle 21 of said faucet body 20.

Rotatable within said barrel 28 is a valve stem 27 which is provided with an extension 32 of reduced diameter at its lower end, said extension being formed with a slot 33 diametrically thereacross. Fitted into said slot 33 in a back-to-back relation are a pair of spring members 34—34 preferably fabricated from flat strip spring metal such as spring brass, or like spring metal, which is non-corrosive in the water or other fluid with which the insert is desired to be used. Each said spring member 34 includes opposite legs 35 which are adapted to spring radially outward as viewed in Fig. 8 and thereby press the resilient valve members 36 of rubber or rubber-like material into engagement with the cylindrical wall of said barrel. The ends of said legs 35 are bent radially outward as best shown in Fig. 8 whereby said valve members 36 will be connected for rotation in unison with said valve stem 27. In Figs. 7 and 8 the valve assembly is shown in an open position with water free to flow from the inlet port 22 through the bore at the lower end of barrel and the space around stem extension 32, through the diametrically opposed slits 3, and through the nozzle 21.

As apparent, when stem 27 is rotated 90° in either direction from the position shown in Fig. 8, the valve members 36 will completely cover the slits 3 in said barrel 28 whereby to cut off such flow of water through the faucet. Again, by reason of the narrow slits 3, the pressure of the water in the inlet port 22 will not cause excessive extrusion or bulging of the resilient valve members 36 into such slits. Furthermore it is to be noted that the rotary sliding action along inclined slits as in Figs. 3 and 4 effects a self-cleaning action to remove any particles of grit or other foreign matter from the outer faces of the valve members. It is further to be observed that the pressure of the fluid in port 22 will augment the pressure exerted by the spring members 34 in order to maintain a fluid-tight seal when the stem 27 is rotated to closed position.

Above the sliding seat structure just described the stem 27 is formed with a peripheral groove in which is disposed a packing ring 37 adapted to establish a seal between said stem 27 and said tubular body or barrel 28. As evident, said packing ring 37 precludes leakage of fluid between stem 27 and barrel 28.

Figure 9:
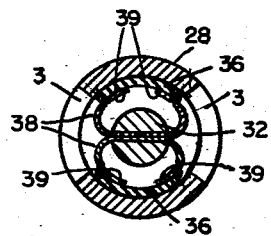
Fig. 9 is a cross-section view similar to Fig. 8 but illustrating a modification.

In the modification illustrated in Fig. 9, the spring members 38—38 are each provided with a pair of legs 39—39 which are bent toward each other and are adapted to exert radial outward pressure against the resilient valve members 36. Said spring members 38—38 are further formed with radial off-set or stepped portions which engage the opposite ends of each valve member 36 whereby to effect rotation of the valve members in unison with the valve stem. Otherwise the Fig. 9 construction is the same as that of Figs. 7 and 8 and therefore further elucidation is not required.

It can thus be seen in Figs. 7, 8, and 9 that a single spring means (spring members 34—34 or 38—38) serve the dual function of non-rotatably connecting the resilient valve members 36 to the valve stem 27 and of exerting radial outward pressure against said valve members to assure fluid-tight sealing thereof against the slitted wall of barrel 28.

In summary it will be seen that in each of the several sliding seat structures, the life thereof will be exceedingly long because of the constant pressure exerted by the resilient valve members against an apertured wall and in some cases augmented by springs. Furthermore, as is well known, water is an excellent lubricant for rubber, synthetic rubber, and flexible plastic materials whereby in the sliding seat structures wherein the valve members have rotary sliding engagement within a body or barrel member the valve stem can be freely turned without danger of application of excess torque thereon. As a further feature of the invention the provision of the elongated narrow slits as discharge passages through the wall of the tubular barrel or like member prevents extrusion of the valve members thereinto whereby to eliminate any tendency of pinching and thus of damaging the valve members. In addition, the inclining of the slits with respect to the path of movement of the valve members further precludes the possibility of pinching and aids in the self-cleaning action of such slits during the sliding movement of the valve members therealong and while in engagement therewith.

Other modes of applying the principle of the invention may be employed, change being made as regards the details described, provided the features stated in any of the following claims, or the equivalent of such, be employed.

I therefore particularly point out and distinctly claim as my invention:

1. A sliding seat structure for faucets comprising a tubular body formed with a bore therethrough, a seat washer carried at one end of said body adapted to be seated against a ring seat in a faucet, a valve stem rotatable within said body and formed with a reduced end portion adjacent such one end of said body, means predeterminedly positioning said stem axially within said body, said body being formed with a pair of narrow transverse slits through the wall thereof opposite such reduced end portion of said stem, a pair of diametrically opposed elastic members in the space between said body and such reduced end portion of said stem, said stem being formed with a slot diametrically across such reduced end portion, and a pair of strip stock spring members fitted into such slot for rotation in unison with said stem and provided with ends bearing against said elastic members to urge the latter radially outward into engagement with the wall of the bore in said body, said elastic members and spring members being further formed with interengaged radial shoulders to thus provide a non-rotary connection between said stem and elastic members, said elastic members being disposed to alternately cover and uncover such slits in said body upon rotation of said stem whereby to open and close the faucet in which said valve structure is adapted to be installed.

2. A sliding seat structure for faucets comprising a tubular body formed with a bore therethrough, a seat washer carried at one end of said body adapted to be seated against a ring seat in a faucet, a valve stem rotatable within said body and formed with a reduced end portion adjacent such one end of said body, means predeterminedly positioning said stem axially within said body, said body being formed with a narrow transverse slit through the wall thereof opposite such reduced end portion of said stem, an elastic member in the space between said body and such reduced end portion of said stem, said stem being formed with a slot diametrically across such reduced end portion, and a spring member fitted into such slot for rotation in unison with said stem and provided with an end bearing against said elastic member to urge the latter radially outward into engagement with the wall of the bore in said body, said elastic member and spring member being further formed with interengaged radial shoulders to thus provide a non-rotary connection between said stem and elastic member, said elastic member being disposed to alternately cover and uncover such slit in said body upon rotation of said stem whereby to open and close the faucet in which said valve structure is adapted to be installed.

References Cited in the file of this patent

UNITED STATES PATENTS

| Number | Name | Date |
|---|---|---|
| 604,835 | McCarroll | May 31, 1898 |
| 943,404 | Hasek | Dec. 14, 1909 |
| 1,668,128 | Ruths | May 1, 1928 |
| 2,075,459 | Parker | Mar. 30, 1937 |
| 2,075,460 | Parker | Mar. 30, 1937 |
| 2,138,621 | Beehler | Nov. 29, 1938 |
| 2,244,759 | Bogardus | June 10, 1941 |
| 2,270,078 | Mueller | Jan. 13, 1942 |
| 2,274,731 | Parker | Mar. 3, 1942 |
| 2,420,785 | Lorraine | May 20, 1947 |
| 2,545,220 | Wolcott | Mar. 13, 1951 |
| 2,556,308 | Weatherhead | June 12, 1951 |

FOREIGN PATENTS

| Number | Country | Date |
|---|---|---|
| 3,774 | Great Britain | 1908 |
| 616,805 | Great Britain | 1949 |
| 519,774 | Germany | 1931 |